US008180892B2

(12) United States Patent
Deridder et al.

(10) Patent No.: US 8,180,892 B2
(45) Date of Patent: May 15, 2012

(54) APPARATUS AND METHOD FOR MULTI-USER NAT SESSION IDENTIFICATION AND TRACKING

(75) Inventors: Darren Deridder, Ottawa (CA); Kelvin Edmison, Ottawa (CA); Robert Gaudet, Ottawa (CA)

(73) Assignee: Kindsight Inc., Sunnyvale, CA (US)

( * ) Notice: Subject to any disclaimer, the term of this patent is extended or adjusted under 35 U.S.C. 154(b) by 351 days.

(21) Appl. No.: 12/645,332

(22) Filed: Dec. 22, 2009

(65) Prior Publication Data
US 2010/0161795 A1 Jun. 24, 2010

Related U.S. Application Data

(60) Provisional application No. 61/140,066, filed on Dec. 22, 2008.

(51) Int. Cl.
*G06F 15/173* (2006.01)
(52) U.S. Cl. ........ 709/224; 370/252; 370/254; 370/260; 370/231; 709/203; 709/227; 709/219
(58) Field of Classification Search .................. 709/203, 709/224, 227, 219; 370/252, 254, 260, 231
See application file for complete search history.

(56) References Cited

U.S. PATENT DOCUMENTS

| 7,433,325 | B1 * | 10/2008 | Sagy et al. | 370/254 |
|---|---|---|---|---|
| 2004/0260763 | A1 * | 12/2004 | Bhattacharya et al. | 709/202 |
| 2009/0031029 | A1 * | 1/2009 | Rice | 709/227 |
| 2009/0175197 | A1 * | 7/2009 | Nechushtan et al. | 370/254 |
| 2011/0145391 | A1 * | 6/2011 | Ivershen | 709/224 |

FOREIGN PATENT DOCUMENTS
WO 01/15405 A2 3/2001

OTHER PUBLICATIONS

Fyodor, "Remote OS Detection via TCP/IP Stack FingerPrinting", http://nmap.org/nmap-fingerprinting-article,txt, Oct. 18, 1998, 11 pages.
Zalewski, M., "Passive OS Fingerprinting Tool", http://lcamtuf.coredump.cx/p0f.shtml, Sep. 6, 2006, 3 pages.
Beverly, R., "A Robust Classifier for Passive TCP/IP Fingerprinting"< MIT Computer Science and Artificial Intelligence Laboratory, Apr. 2004, 11 pages.
Bellovin, S. M., "A Technique for Counting NATted Hosts", AT&T Labs Research, IMW'02, Nov. 6-8, 2002, 6 pages.
Daicos, C., Knight, S., "A Passive External Web Surveillance Technique for Private Networks", Royal Military College of Canada, Sep. 19, 2005, 17 pages.
Phaal, P., "Detecting NAT Devices using sFlow", http://www.sflow.org/detectNAT/, Apr. 22, 2003, 4 pages.

* cited by examiner

*Primary Examiner* — Wing Chan
*Assistant Examiner* — Hitesh Patel
(74) *Attorney, Agent, or Firm* — Osha • Liang LLP (57) ABSTRACT

A method and apparatus are provided for identifying and tracking multiple computer user sessions associated with a network address translation (NAT) device coupled to a computer network. Data packets originating from the NAT device containing a request to a destination server coupled to the computer network are received. A client source address associated with the data packets is determined where the source address associated with the NAT device. One or more session entries associated with the client source address can then be determined, wherein the session entries are stored in system state information. A session signature can then be determined based one or more characteristics defined by the data packet header information and/or request header information in the one or more data packets, the session signature uniquely identifying one of the multiple computer user sessions coupled to the NAT device.

17 Claims, 7 Drawing Sheets

Figure 7

APPARATUS AND METHOD FOR MULTI-USER NAT SESSION IDENTIFICATION AND TRACKING

CROSS-REFERENCE TO RELATED APPLICATIONS

This application claims priority, under 35 U.S.C. §119(e), to U.S. Provisional Patent Application Ser. No. 61/140,066, filed on Dec. 22, 2008. U.S. Provisional Patent Application Ser. No. 61/140,066 is hereby incorporated by reference in its entirety.

TECHNICAL FIELD

The present invention relates to the field of Internet Protocol session detection. In particular, to an apparatus and a method for multi-user NAT session identification and tracking.

BACKGROUND

The popularity of network address translation (NAT) devices such as home wireless routers has given rise to an increasing number of households with multiple computing devices sharing a single network connection. These devices make it difficult to distinguish the network traffic of multiple clients within a local area network, as their traffic appears to emanate from a single source Internet Protocol (IP) address.

Earlier proposed solutions have been based on operating system (OS) fingerprinting, Internet Protocol Identifier (IPID) analysis, and snooping network traffic headers and content. Tools such as p0f (refer to: 'passive OS fingerprinting tool', Michal Zalewski, <lcamtuf@coredump.cx>, 2000-2006; the entirety of which is hereby incorporated by reference) have been used in a non-real-time manner to gain information about distinct hosts behind a NAT. These solutions do not address the problem of tracking multiple active hosts, behind a NAT device, simultaneously in real-time.

Accordingly, a method and apparatus that enable the identification of multiple, simultaneously active clients behind a NAT device and for distinguishing their individual network activity by tracking their respective sessions remain highly desirable.

SUMMARY

In accordance with the present disclosure there is provided a method for identifying and tracking multiple computer user sessions associated with a network address translation (NAT) device coupled to a computer network. The method comprising receiving one or more data packets originating from the NAT device, the one or more data packets containing a request to a destination server coupled to the computer network. Determining a client source address associated with the one or more data packets, the source address associated with the NAT device. Determining one or more session entries associated with the client source address, wherein the session entries are stored in system state information. Determining a session signature based one or more characteristics defined by the data packet header information and/or request header information in the one or more data packets, the session signature uniquely identifying one of the multiple computer user sessions coupled to the NAT device. Storing a new session entry in the system state information if the session signature is not associated with the one of the one or more sessions entries in the system state information.

In accordance with the present disclosure there is also provided an apparatus for identifying and tracking multiple computer user sessions associated with a network address translation (NAT) device coupled to a computer network. The system comprising a processor and a memory for storing instructions for execution by the processor. The instructions comprising a system state information repository for storing a plurality of session entries associated identifying sessions associated with NAT devices. A session detection module for receiving one or more data packets originating from the NAT device, the one or more data packets containing a request to a destination server coupled to the computer network; determining a client source address associated with the one or more data packets, the source address associated with the NAT device. Determining one or more session entries associated with the client source address, wherein the session entries are stored in the system state information. Determining a session signature based one or more characteristics defined by the data packet header information and/or request header information in the one or more data packets, the session signature uniquely identifying one of the multiple computer user sessions coupled to the NAT device. Storing a new session entry in the system state information repository if the session signature is not associated with the one of the one or more sessions entries in the system state information. A session declaration module for providing session identifying information, including an HTTP header summary and an associated session identifier, to one or more external systems for their use.

Other aspects and features of the present disclosure will become apparent to those ordinarily skilled in the art or science to which it pertains upon review of the following description of specific embodiments of the disclosure in conjunction with the accompanying figures.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Embodiments are described below, by way of example only, with reference to FIGS. 1-7. The systems and methods described herein can be used to process network traffic associated with an IP address and determine based on the characteristics of the traffic if the traffic is associated with a current user's session (i.e. the traffic is generated by the same user browsing various web sites on a computer) or if the traffic is associated with a new user's session.

A system and method for multi-user NAT session identification and tracking that mitigates the deficiencies of previous solutions is provided. By introducing a link-chaining technique, a Transmission Control Protocol (TCP)-timestamp (which may indicate system uptime) analysis, the evaluation of multiple criteria in combination via a weighted scoring algorithm, the improvement of IPID tracking through the use of TCP/IP flow analysis, and by avoiding the inspection of message content individual user sessions sharing a common IP address can be identified and tracked. The present disclosure does not attempt to count the number of computers behind a NAT device, or to discover the type of operating system. Rather, it differentiates multiple, simultaneous browsing sessions generated from distinct hosts behind a NAT device.

In order to identify sessions associated with a NAT device, the present disclosure does not snoop for updated sessions in the sense of inspecting cookie session identifiers, etc. For Hypertext Transport Protocol (HTTP) session tracking, the system filters all non-HTTP traffic and does session tracking on a more limited set of traffic (no ICMP, update requests) although non-port 80 TCP traffic can be included in order to track IPID's more closely. In addition the apparatus and method does not directly attempt to detect the presence of a NAT device in customer premises using the Time-to-Live (TTL) parameter and does not snoop any application-layer content. The system and method described herein relies on header information only in order to identify individual sessions sharing a common IP address.

Figure 1:
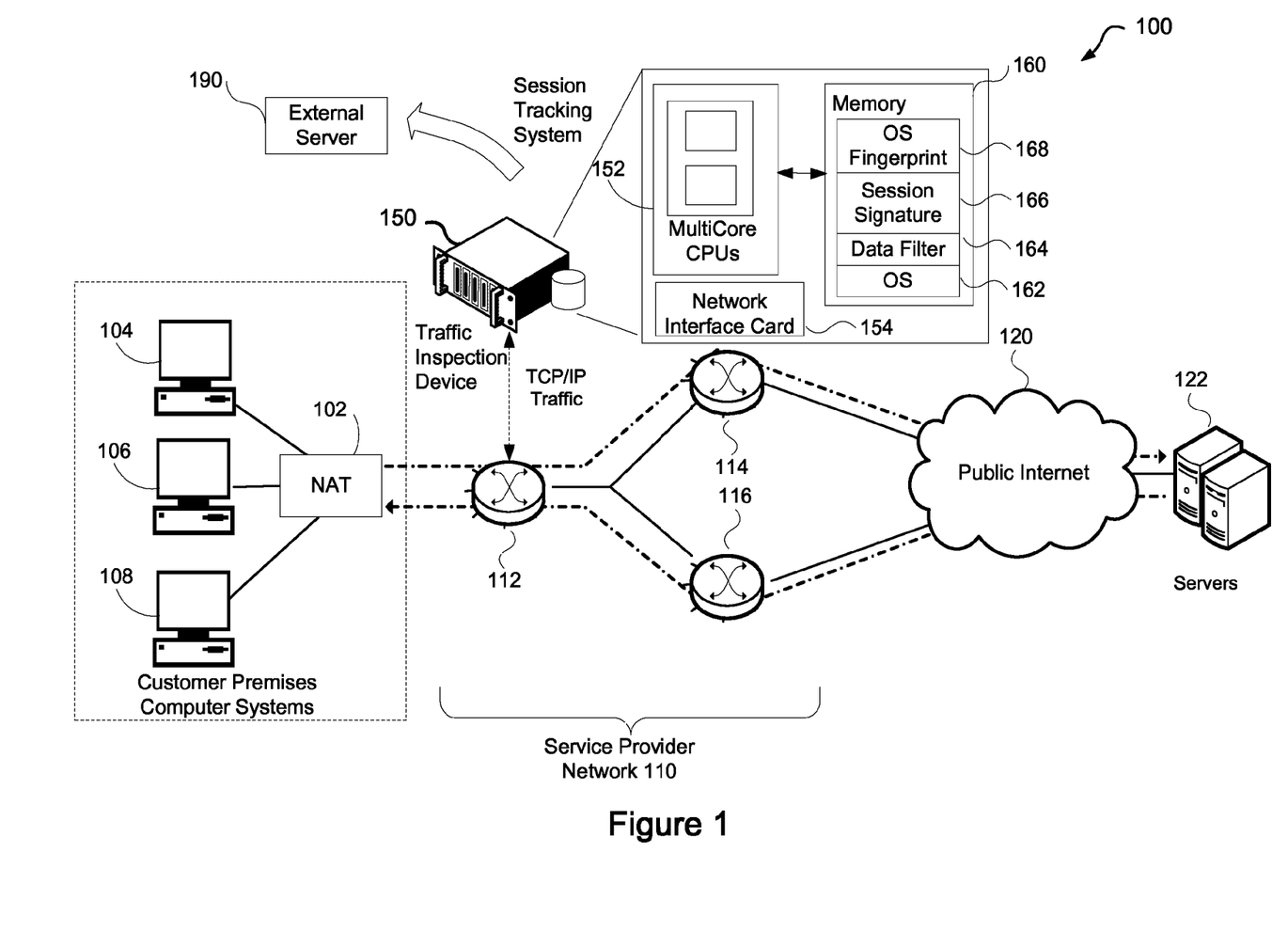
FIG. 1 is a schematic representation of a system providing multi-user NAT session identification and tracking in a typical operating environment.

FIG. 1 is a schematic representation of a session tracking system 100 for multi-user NAT session identification and tracking in a typical operating environment. The network traffic on the service provider network 110 is passed to a traffic inspection device 150 with a high-speed network interface that is capable of receiving all network packets for computational analysis. The service provider network comprises multiple routing devices, such as 112, 114 and 116 connected to additional networks such as the public internet 120 which external servers 122 are connected to. The session tracking system 100 can be implemented as part of the traffic inspection device (e.g. data filter) 150. The inspection system 150 can be implemented at the edge of the ISP network at router 112 to ensure all traffic between a user computer system (104 to 108) is inspected. Alternatively the inspection device may be located within the service provider network 110 with packets received from the NAT device 102 being copied or forwarded to the inspection device 150. Alternatively, the traffic inspection device 150 may function inline with the network traffic. The system can optionally be operated between a first mode in which NAT session tracking is enabled and a second mode in which NAT session tracking is disabled. When NAT session tracking is disabled, all traffic to or from a single client Internet Protocol (IP) address is viewed as belonging to a single user or session. When NAT session tracking is enabled, the sessions associated with multiple users (104 to 108) behind a NAT device 102 can be detected, and their traffic can be differentiated.

The inspection device 150, implements the session tacking system 100 configured on a computing platform. The computing platform comprises at least a processing unit 152 such as multi-core computer processing units (CPUs) for executing instructions retrieved from a memory 160. The memory 160 provides instructions for implementing an operating system (OS) 162, a data filter function 164, an OS fingerprint function 166 and a session signature function 168. The memory 160 may also store and track identified sessions. A network interface card 154 provides an interface to the Service Provider Network 110 for receiving packets for processing and enables communication with external servers 190 which provide services for utilizing the session tracking functionality for services such as network monitoring, targeted advertising, malware detection etc.

Sessions (i.e. end-users on different computer systems (104 to 108)) are modeled as a combination of an operating system (OS) fingerprint and a session signature. The first stage of session detection involves the detection of an OS fingerprint from captured packets that provides a unique signature for a particular operating system. Multiple OS fingerprints emanating from a single source IP address serve to differentiate disparate computers (104 to 108) behind a NAT device 102. The OS fingerprint stage leverages a degree of packet reassembly to construct the TCP/IP flow and OS fingerprint information belonging to application-layer messages.

Because some computers (104 to 108) with identical characteristics will share the same OS fingerprint, a second stage involves creating a session signature that provides additional distinguishing characteristics for traffic generated by different clients. Several alternative algorithms can be employed in the second stage depending on the characteristics of the traffic, which can include elements of the OS fingerprint, and additional criteria derived from protocol header analysis. Illustrative algorithms are described below. One skilled in the art will appreciate that additional characteristics of the traffic may be used to provide session tracking for additional systems that do not display or use similar characteristics to those described in the illustrative algorithms below.

Session tracking for clients (i.e. end-user computer systems (104 to 108)) with operating systems of a Unix/Linux lineage, including Mac OS™, makes use of the TCP timestamp option to differentiate clients. In these systems the TCP timestamp relates to how long the computer system has been on. Microsoft® Windows®-based clients make use of criteria that include the IPID, user-agent and referrer fields in protocol headers, as well as an analysis of TCP/IP flows and timing.

Different algorithms are utilized to be inserted into a logical program flow, permitting variations in the order of precedence, weight, and logic applied to these criteria, and allowing new criteria to be included for analysis.

Figure 2:
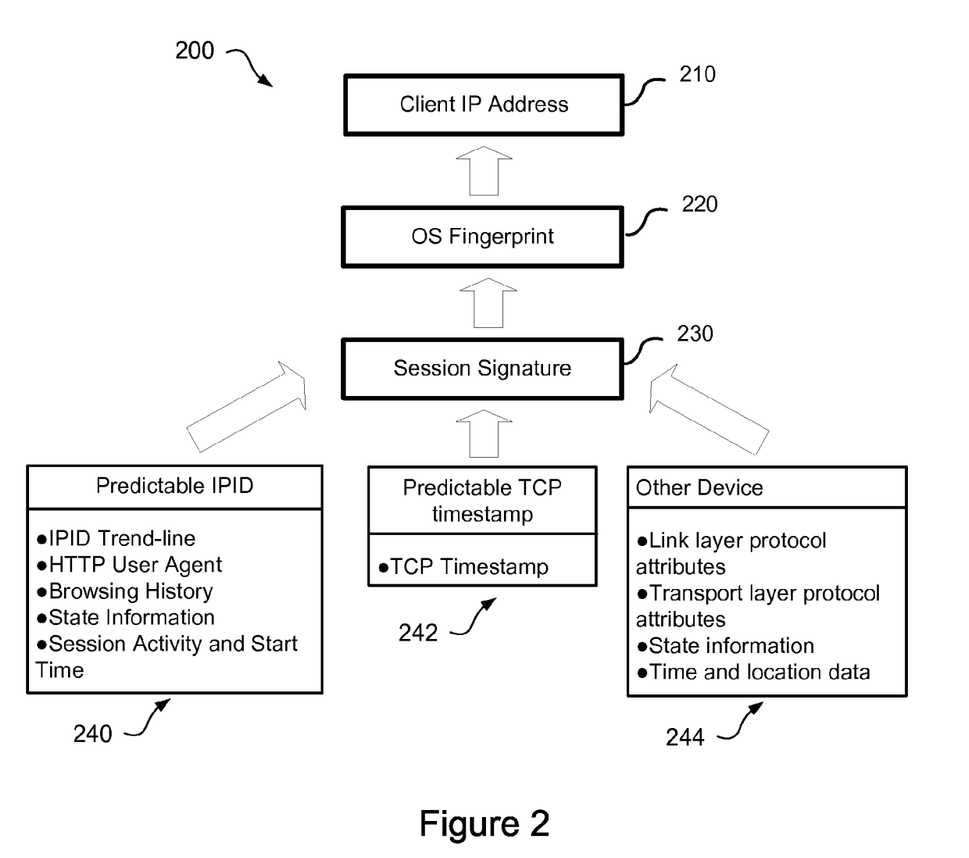
FIG. 2 is a representation of an exemplary model of a client session.

FIG. 2 is a schematic representation of an exemplary model 200 of a client session. The model 200 comprises a client IP address 210, an OS fingerprint 220, and a session signature 230. The session signature 230 can include alternative content 240, 242, 244 based on the OS fingerprint 220 and the presence or value of parameters in the captured packets such as, for example, a TCP timestamp, IPID and User Agent string. The system can make use of TCP/IP flows, OS fingerprints, TCP timestamps, IPID trendlines, user-agent strings, link-chain detection, refresh detection, and session activity to characterize a session.

Flows

A flow is a TCP/IP connection between a client and a server, characterized by an "IP 5-tuple". The IP 5-tuple includes the protocol, the source IP address, the source port, the destination IP address, and the destination port. Packets within the same flow, that is packets with the same IP 5-tuple, are deemed to belong to the same session. Similarly, application layer messages (such as HTTP) within a flow are deemed to belong to the same session. This information is leveraged to prevent the unnecessary running of the entire algorithm against each and every packet or application layer-message.

OS Fingerprint

An OS fingerprint uses IP and TCP header fields from the initial TCP synchronization (SYN) packet of a connection to provide a unique signature or "fingerprint" of the OS that generated the packet. The present invention makes use of most of the fields found in the passive OS fingerprinting tool 'p0f'. However, unlike 'p0f', the present system does not try to match the fingerprint to a list of known OS fingerprints, because it is concerned less with the characterization of computer systems and more with the detection and tracking of unique sessions. Therefore, the presence of multiple distinct fingerprints is enough to indicate multiple hosts behind a NAT device.

HTTP User Agent

An HTTP user agent string is an indicator of the application that generated an HTTP application layer message. This criteria is available for use in the algorithm to distinguish sessions, for example where one session is from the Internet Explorer® web browser and another session is from the Mozilla® Firefox® web browser.

IPID Trendlines

Research by Steve Bellovin (Steven M. Bellovin, "A Technique for Counting NATted Hosts. Proc. Second Internet Measurement Workshop, November 2002, http://www.cs.columbia.edu/~smb/papers/fnat.pdf), Rob Beverly (Rob Beverly, "A Robust Classifier for Passive TCP/IP Fingerprinting", MIT CSAIL, Apr. 20, 2004, http://rbeverly.net/research/finger/tcpclass.pdf,) and others has shown the IPID parameter is highly predictable on Windows® OS's and is typically implemented as a simple incrementing counter. The present system inspects IPIDs and constructs "trend lines" which can be used to identify new sessions and to match traffic to existing sessions. The trend line of an existing session can be used to predict the IPID values expected from the session traffic, and if the received IPID values match, or are within a given threshold, the traffic can be matched to the existing session.

TCP Timestamps

For Mac® and Linux OS variants, the TCP timestamp option is used to estimate the uptime of the host. Although this value may be pseudo-random at boot time, it has been shown to increment in a highly predictable manner and is used to distinguish multiple Mac and/or Linux clients behind a NAT device. TCP timestamps can increment at different rates for different operating systems. This can be accommodated in the session matching algorithm by not requiring an exact match, but rather by allowing a timestamp to fall within a configurable range of an expected value.

Link-Chain and Refresh Detection

The system maintains session state information that includes a history of visited Universal Resource Locators (URL); the number of which is configurable. An HTTP Referrer field is compared against this browsing history to detect a "link chain"—a web page that was navigated to by clicking a hyperlink in a previously viewed hypertext document. If the Referrer field is absent, the requested URL is compared against the browsing history to detect a page refresh, as is common when the browser "refresh" button is clicked or a page implements an automatic "HTTP-refresh" function.

Session Activity

The activity of a session (i.e. frequency with which events are associated with a given session) is also included as a criteria for session tracking. The present invention makes a provision for considering the relative activity of a session when deciding which of two or more sessions the traffic belongs to. This accommodates, for example, the observation that web-browsing activity tends to be "bursty", with a high number of requests being generated in a short period of time, as a web page with all its associated images and media is loaded into the user's web browser.

The available criteria are calculated and assigned a weight by the algorithm, which then calculates a matching score for messages against existing sessions. If no acceptable match is found, a new session may be generated. When a match is found the appropriate session state information is updated with the most recent values of the criteria (IPID, TCP timestamp, etc).

Figure 3:
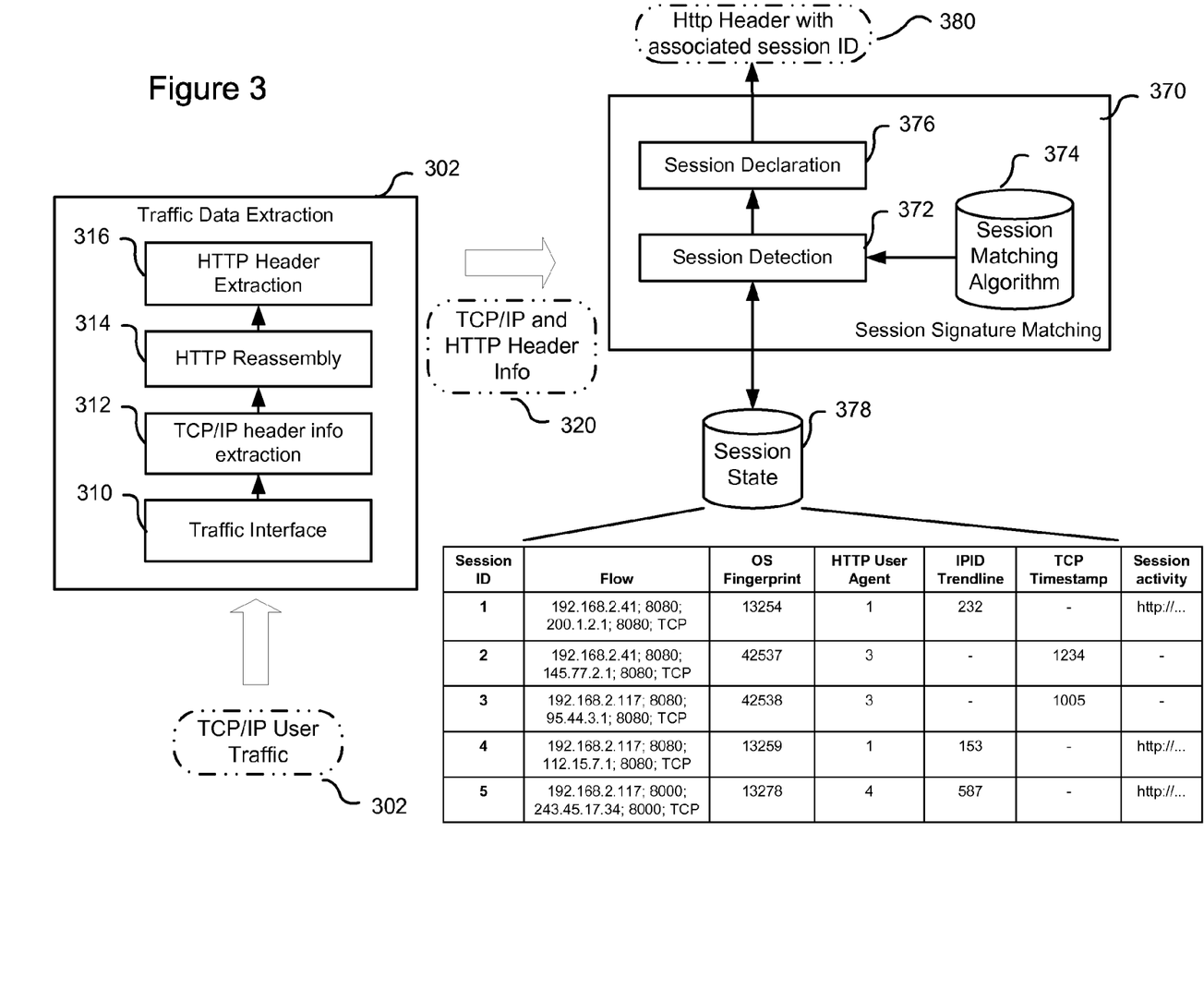
FIG. 3 is a schematic representation of an apparatus for multi-user NAT session identification and tracking.

FIG. 3 is a representation of the session tracking system 100. The session tracking system 100 comprises a traffic data extraction module 302, a session signature matching module 370, and data storage repository 378 for storing system state information associated with identified sessions. The traffic data extraction module 302 comprises a traffic interface 310, a TCP/IP header info extraction module 312, an HTTP reassembly module 314, and an HTTP header extraction module 316. The traffic interface 310 receives packets in a TCP/IP traffic stream 302 from the service provider network 110. The TCP/IP header info extraction module 316 extracts information (i.e. data) from the header of TCP/IP packets. The HTTP reassembly module 314 provides for HTTP information that is contained across multiple TCP/IP packets, including both payloads and headers, to be reassembled into an HTTP header. The HTTP header extraction module 316 provides for extracting information (i.e. data) from the reassembled HTTP header. The extracted TCP/IP and HTTP header information 320 are forwarded to the session signature matching module 370 for analysis. Although HTTP header information is described other application layers protocols such as file transfer protocol (FTP) headers, Real Time Messaging Protocol (RTMP) headers, etc may be utilized.

The session signature matching module 370 comprises a session detection module 372, a session matching algorithm repository 374, and a session declaration module 376. The session detection module 372 performs session detection in order to detect new sessions and matches traffic to existing sessions that meet the criteria according to algorithms obtained from the session matching algorithm repository 374. The session detection module 372 uses the data storage repository 378 to store and retrieve session state information, in accordance with the model described above with reference to FIG. 2, for a plurality of sessions. The session state information can comprise flow (IP 5-tuple), OS fingerprint, HTTP user agent, IPID trendline, TCP timestamp, linkchain and refresh detection and session activity. When a new session has been detected or an existing session that matches the HTTP traffic characteristics is found, the session declaration module 376 can provide session identifying information, including an HTTP header summary and an associated session identifier 380, to one or more external systems for their use. Although the system state information is shown in table format the associated session information may be stored in a number of data structures which permit direct access to the required data.

Figure 4:
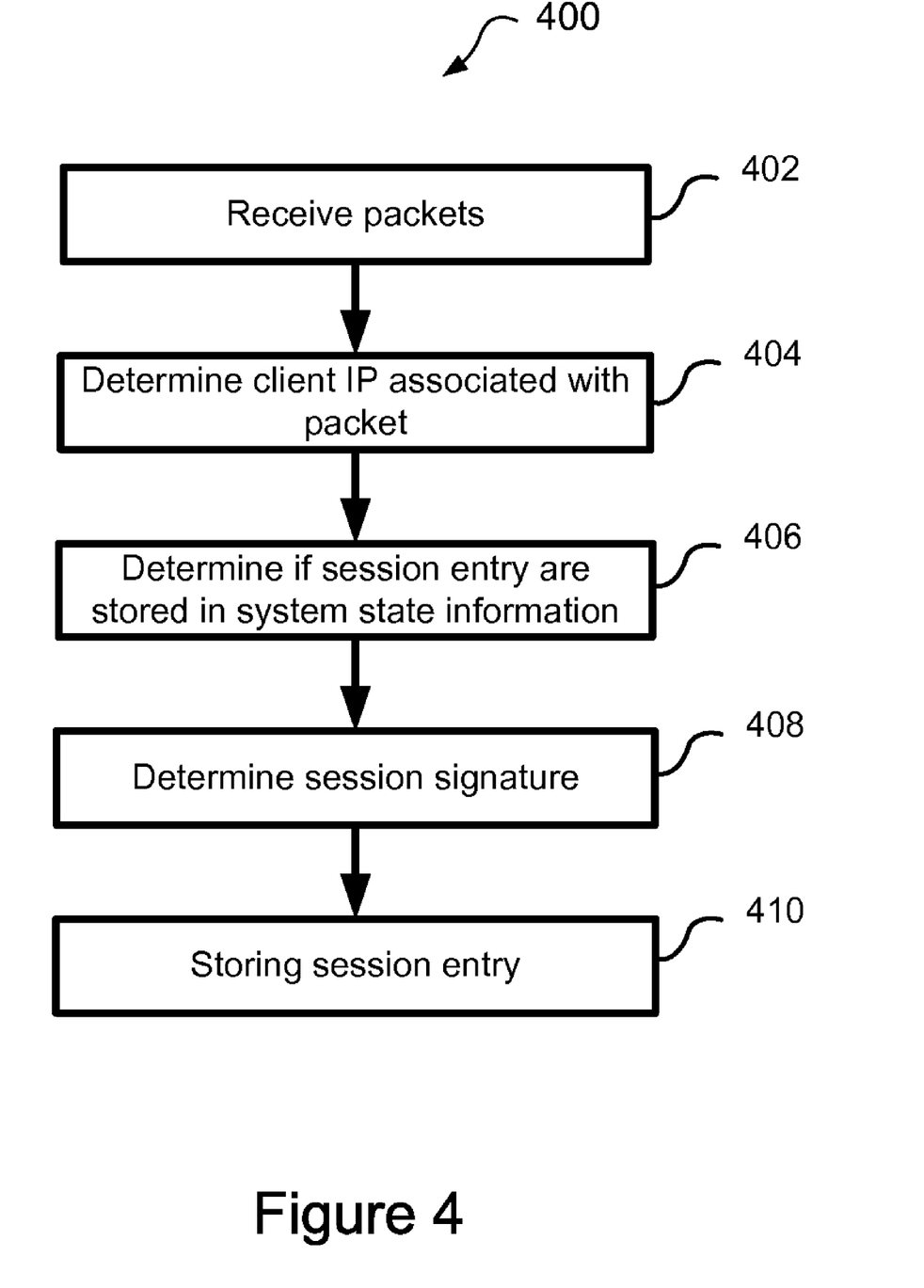
FIG. 4 is a method for identifying multiple, simultaneous active clients behind a NAT device.

FIG. 4 is flow diagram representing a method 400 for multi-user NAT session identification and tracking. One or more data packets originating from the NAT device containing a request to a destination server coupled to the computer network are received 402. The TCP/IP header information is extracted from the packets and HTTP reassembly is performed to extract an HTTP request. From the TCP/IP header a client source address associated with the NAT device is determined at 404. One or more session entries that are associated with the client source address are determined at 406. If no entries are found, however, the method may create a new session associated with the client source address. The one or more session entries may be included or stored in the system state information. A session signature is then determined at 408 based one or more characteristics. The specific characteristics used to determine the session signature may be based upon the OS fingerprint, as described further in FIG. 6. The characteristics and their respective values may be located in the data packet header information and/or request header information provided by the packets. The session signature uniquely identifies one of the multiple computer user sessions coupled to the NAT device. The session signature may then be stored as a new session entry at 410. Alternatively, the session signature may be used to update an existing session entry with the new session signature.

Figure 5:
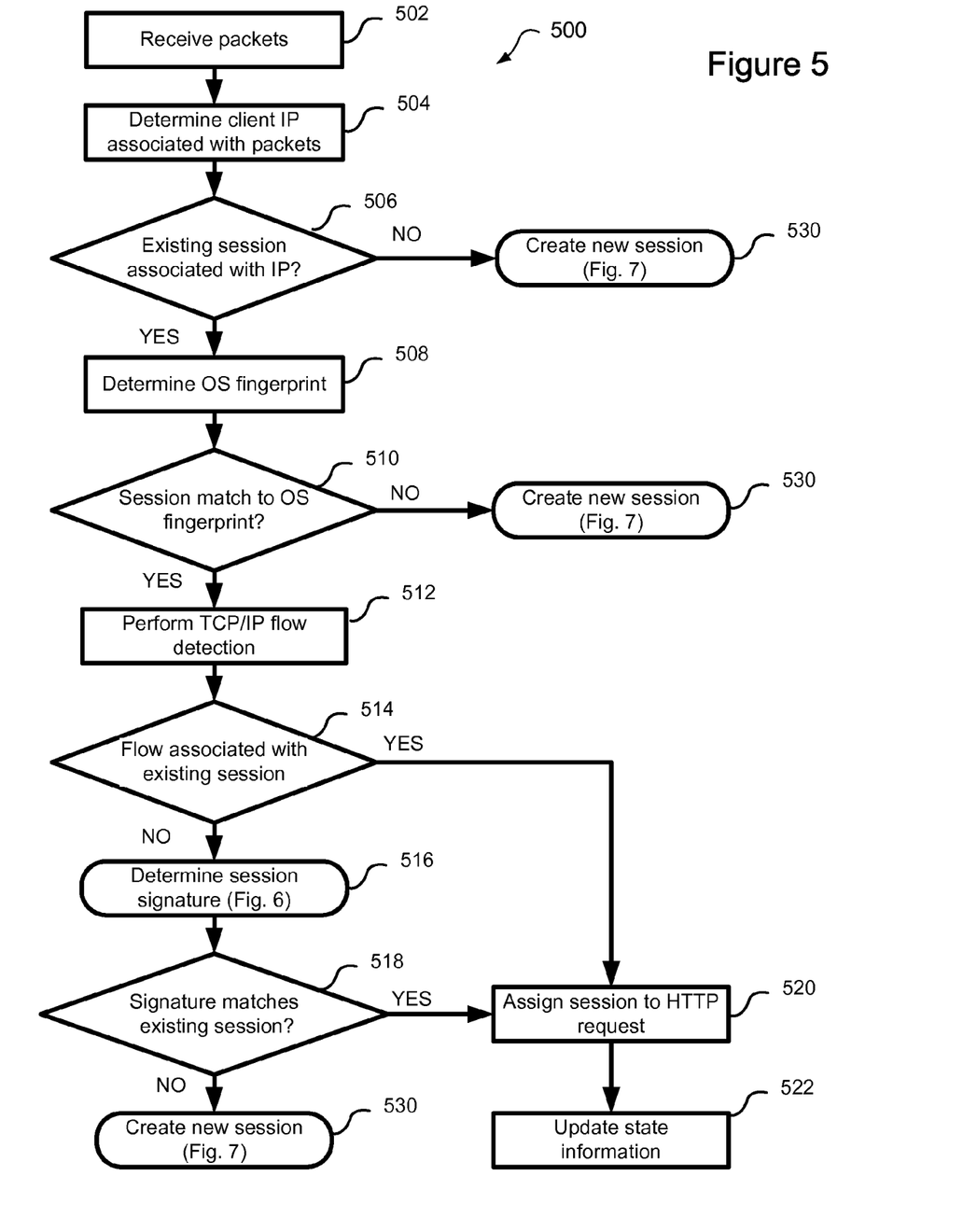
FIG. 5 is another method for identifying multiple, simultaneous active clients behind a NAT device.

FIG. 5 is flow diagram representing a method 500 for multi-user NAT session identification and tracking in a session tracking system 100. One or more data packets originating from the NAT device containing a request to a destination server coupled to the computer network are received at 502. The TCP/IP header information is extracted from the packets and HTTP reassembly is performed to extract an HTTP request. From the TCP/IP header a client source address associated with the NAT device is determined at 504. It is determined if one or more session entries are associated with the client source address stored in system state information at 506. If the a session entry is not associated with the client IP, NO at 506, a new session entry is created at 530, as described in FIG. 7. If an existing session entry is associated with the IP address in the system state information, YES at 506, then the session that the traffic should be associated with is determined using session detection. The OS fingerprint is determined at 508. The OS fingerprint provides and identifier used to uniquely identify the operating system being utilized by the client. Once the OS fingerprint is determined, it is checked to see if it matches the OS fingerprint of the existing session or sessions 510. If the OS fingerprint does not match a session associated with the client IP in the session system information, NO at 510, a new session entry is created at 530, and described in FIG. 7. If the OS fingerprint matches a session entry in the session state information, YES at 510, a CP/IP flow detection is performed at 512. The flow detection is performed using a 5-tuple comprising a protocol, a source address, a source port, a destination address, and a destination port to identify a packet flow being used by the session. If a packet flow matches a flow associated with a session entry in the system state information, YES at 514, the HTTP request is matched to a corresponding session at 520 and session data is updated at 522. If the flow is not associated with an existing session entry, NO at 514, a session signature is determined at 516. The session signature can be performed based upon the characteristics of one or more of the data packet header information, the request header information and the OS fingerprint. The session signature is then checked to determine if it matches the session signature associated with an existing session at 518. If the session signature matches or is consistent with an existing session entry, YES at 518, the HTTP request is matched to a corresponding session at 520 and session data is updated at 522. If the session signature does not match an existing session entry, NO at 518, a new session is created at 530.

Figure 6:
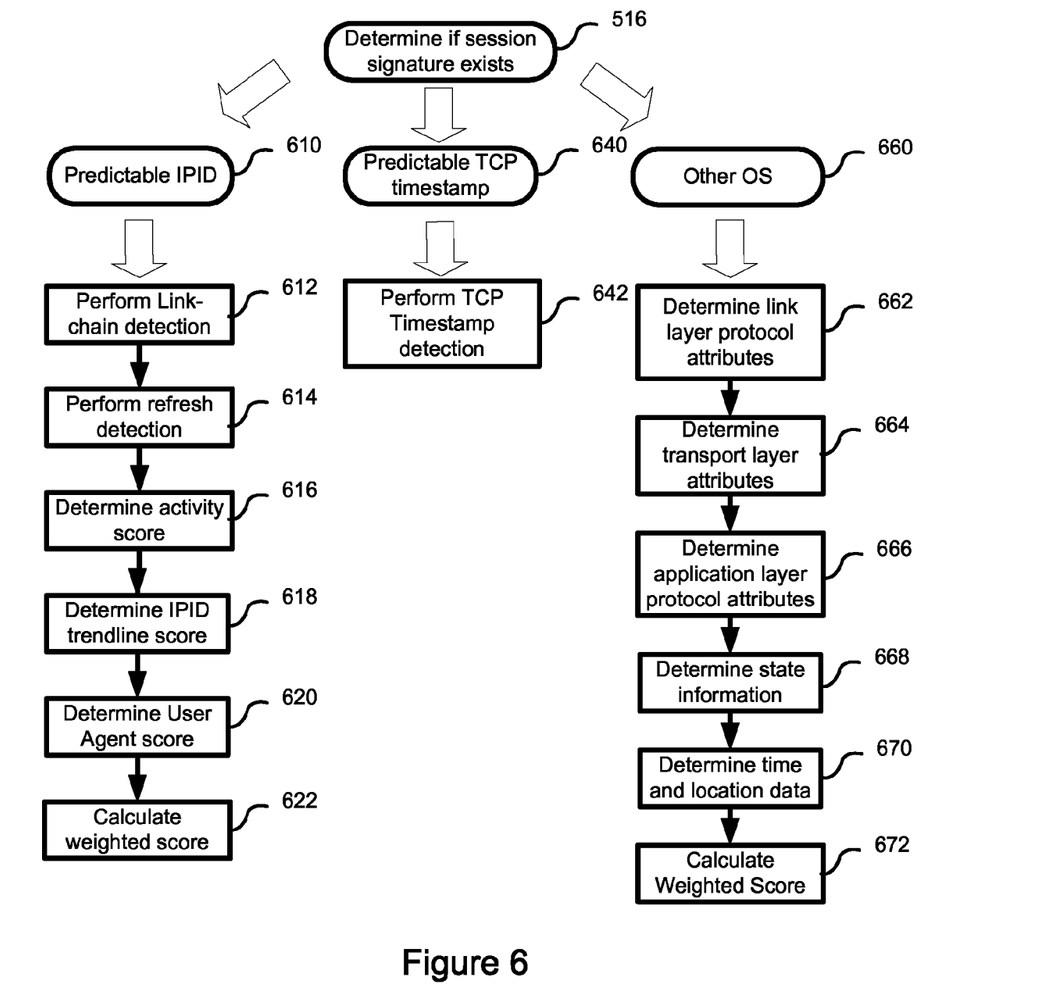
FIG. 6 is a method for determining if a session signature exists.

FIG. 6 is a method for determining if a session signature exists at 516 based upon one or more of the data packet header information, the request header information, and the OS fingerprint. The session signature can be determined based upon various methods. The method used to determine the session signature may be selected based on the OS fingerprint. In an OS that provides a predictable IPID 610 such as Windows™ based operating system, When the OS type is determined to be of the Windows OS type, a series of actions 612 to 622 are executed using algorithms directed to link-chain 612 and refresh detection 614, session activities at 616, IPID trendline at 618, and HTTP user agent 620 score as described above according to available criteria. In executing the method at 612 to 620, a weighted score is calculated at 622 from the available criteria and then compared with previously known weighted scores associated with other session entries to determine the session with the best matching score. When the weighted score exceeds a pre-determined threshold, YES at 518, the HTTP request is matched to a corresponding session at 520 and session data is updated at 522. When the weighted score does not exceed the pre-determined threshold, NO at 518, a new session is created at 530, provided that the HTTP request contains a sufficient number of the aforementioned criteria and appears to belong to a valid web browsing session. Sessions are not created for background processes such as, for example, software automatic updaters.

When the OS type is determined to be an operating system that provides a predictable TCP timestamp at 640 such as a MacIntosh™/Linux OS type, a TCP timestamp in the HTTP request is compared with a previously known TCP timestamps at 642. When the TCP timestamp matches a previously known TCP timestamp, YES at 518, the HTTP request is matched to a corresponding session at 520 and session data is update at 522. When the TCP timestamp does not match the previously known TCP timestamp, NO at 518, a new session is created 530.

When the OS type is determined to be an operating system that does not provide either a predictable IPID or predictable TCP timestamp, additional criteria may be used for determining a relevant session signature score. Determining a session signature for these OSs may comprise determining the link layer protocol attributes at 662, determining transport layer attributes at 664, determining application layer protocol attributes at 666, determining state information at 668, and determining the time and location data 670. Not all criteria may be required to determine an appropriate score based upon the operating system associated with the device. In executing the method at 662-670, a weighted score is calculated at 622 from the available criteria and then compared with previously known weighted scores to determine the session with the best matching score. When the weighted score exceeds a pre-determined threshold, YES at 518, the HTTP request is matched to a corresponding session at 520 and session data is updated at 522. When the weighted score does not exceed the pre-determined threshold, NO at 518, a new session is created at 530, provided that the HTTP request contains a sufficient number of the aforementioned criteria and appears to belong to a valid web browsing session. Sessions are not created for background processes such as, for example, software automatic updaters.

Figure 7:
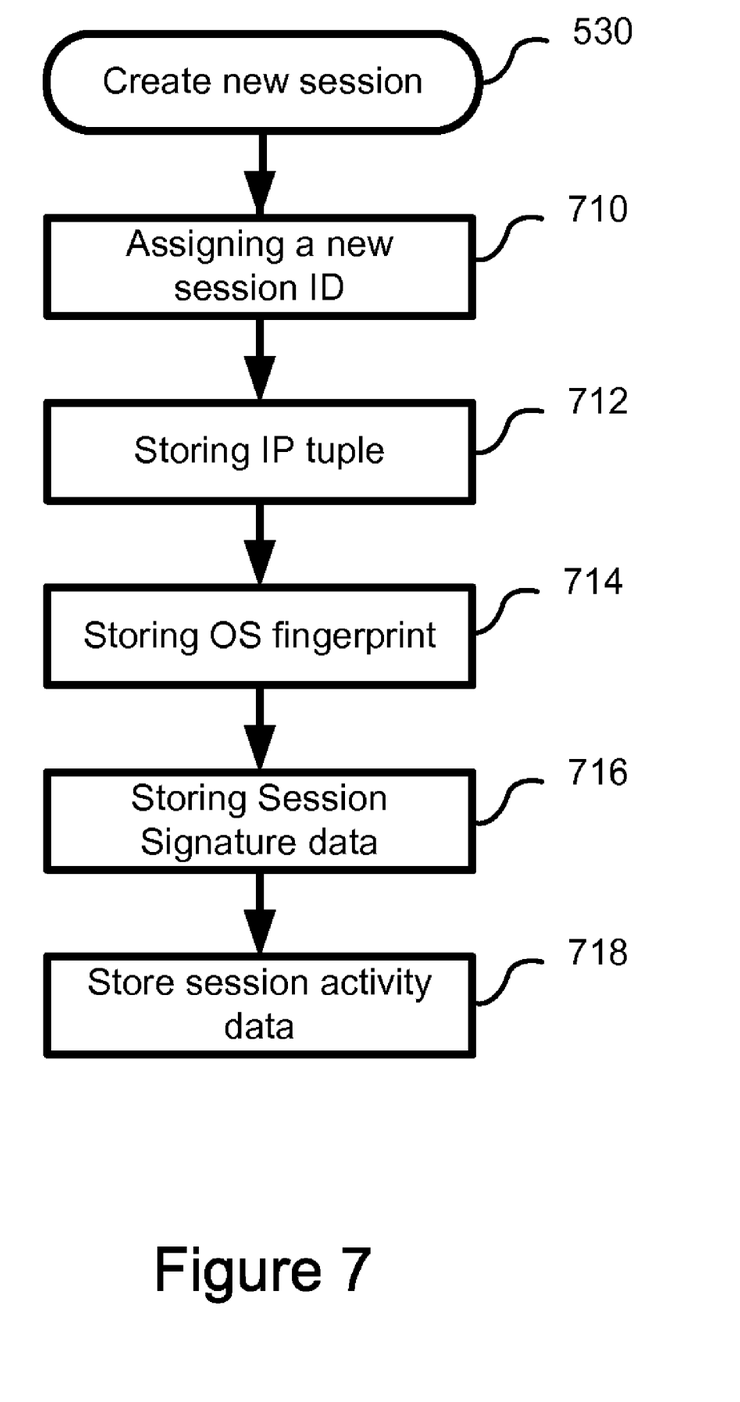
FIG. 7 is a method for creating a new session.

FIG. 7 depicts a method for the creation of a new session at 530 by the session tracking system 100. A new unique session identifier is associated at 710 with the determined client IP address. An IP 5-tuple identifying the particular flow associated with the session is stored at 712. An OS fingerprint is stored at 714 in addition to data associated with the session signature at 716 such as but not limited to the HTTP User agent identifier, IPID trendline value, the real time at which the data packets were received as measured by the systems internal clock, and TCP timestamp data. Session activity such as link-chaining and refresh data is also stored with the associated session at 718. The relevant signature data is stored based upon the OS fingerprint and the parameters that are relevant to the signature process.

The method according to the present disclosure can be implemented using the system described above with reference to FIG. 1. In an alternative embodiment, the method according to the present invention can be implemented using computer executable program instructions stored on a computer-readable storage memory.

While the embodiments described above are directed to the inspection and "sessionization" (i.e. associating with a particular session) of HTTP traffic on 10 Gbps Ethernet-based networks, the present disclosure may be adapted to other Link-layer and Application layer protocols, with some modification to the process flow and selection criteria.

The present disclosure described herein is believed to represent a new and novel approach to multi-user NAT session identification and tracking. The introduction of the TCP timestamp analysis for Mac/Linux differentiation and the use of the link-chaining technique to correlate traffic with existing sessions are also believed to be new additions to a NAT session identification and tracking system.

It will be apparent to one skilled in the art that numerous modifications and departures from the specific embodiments described herein may be made without departing from the spirit and scope of the present invention.

What is claimed is:

1. A method for identifying and tracking multiple computer user sessions associated with a network address translation (NAT) device coupled to a computer network, the method comprising:

receiving one or more data packets originating from the NAT device, the one or more data packets containing a request to a destination server coupled to the computer network, wherein the data packets are transmission control protocol/Internet Protocol (TCP/IP) packets;

determining a client source address associated with the one or more data packets, the client source address associated with the NAT device;

determining one or more session entries associated with the client source address, wherein the session entries are stored in system state information;

determining a session signature based one or more characteristics defined by data packet header information and/or request header information in the one or more data packets, the session signature uniquely identifying one of the multiple computer user sessions coupled to the NAT device, wherein determining the session signature further comprises:

performing link-chain detection by comparing HTTP referrer field against browsing history associated with HTTP header in session and assigning a score to detected links;

performing refresh detection if the HTTP referrer field is absent, a requested URL is compared against the browsing history to detect a page refresh and assigning a score to detected refreshes;

determining an activity score wherein the activity score is determined based upon a frequency with which events are associated with a given session;

determining an IPID trendline score based upon an IPID parameter;

assigning a user agent score based upon a determined web-browser identified in the request; and calculating a weighted score comprising the link chain detection, the refresh detection, the activity score, the IPID score and the user agent score;

wherein the weighted score is compared to one or more weighted scores each associated with a session entry in a session table to determine the session with a best matching score; and storing a new session entry in the system state information if the session signature is not associated with the one of the one or more sessions entries in the system state information.

2. The method of claim 1 wherein performing the lookup of the client source address in the system state information further comprises storing a new session entry for the client source address in the system state information when an associated session entry is not found.

3. The method of claim 1 wherein determining the session signature further comprises determining an operating system (OS) fingerprint using the received one or more packets, wherein the OS fingerprint forms a unique identifier for the operating system of the client computer associated with the one or more data packets.

4. The method of claim 3 wherein determining the OS fingerprint detection further comprises storing a new session entry in the system state information when an associated session entry is not found for the client source address and the OS fingerprint.

5. The method of claim 1 wherein determining the session signature further comprises performing flow detection based upon data packet header data of the received one or more data packets, the flow detection identifying a path between a client device and the destination server.

6. The method of claim 5 wherein performing flow detection further comprises updating an associated session entry in the system state information based upon the received one or more data packets and request information if a flow is associated with one of the one or more session entries in the system state information.

7. The method of claim 6 wherein determining the session signature is performed if the flow is not associated with any of the one or more sessions in the system state information.

8. The method of claim 1 wherein determining the session signature further comprises updating a session entry in the system state information based upon the received one or more data packets and the request header information if the session signature is associated with the one of the one or more sessions in the session table.

9. The method of claim 1 wherein an OS fingerprint forms an identifier for a computer operating system based upon the operating system version and its subsidiary software components, the value of which is unique for the given operating system version and subsidiary software components.

10. The method of claim 1 wherein when the weighted score exceeds a pre-determined threshold, the HTTP request is matched to a corresponding session.

11. The method of claim 10 wherein when the weighted score does not exceed a pre-determined threshold, a new session is created.

12. The method of claim 1 wherein the session signature is determined by comparing a TCP packet TCP timestamp to a previously known TCP timestamp in one or more session entries in the system state information, and wherein when the TCP timestamp matches a previously known TCP timestamp, the HTTP request is consistent with a corresponding session and when the TCP timestamp does not match a previously known TCP timestamp, a new session entry is added to the system state information.

13. The method of claim 1 wherein creating the session entry comprises:

assigning a session ID;

storing a 5-tuple associated with the received one or more data packets;

storing a determined OS fingerprint;

storing the determined session signature; and storing session activity data comprising request information.

14. The method of claim 13 wherein the 5-tuple comprises a protocol, a source address, a source port, a destination address, and a destination port.

15. The method of claim 1 further comprising assigning a session identifier to the request header information and forwarding the session request header information and session identifier to another system.

16. An apparatus for identifying and tracking multiple computer user sessions associated with a network address translation (NAT) device coupled to a computer network, the system comprising:

a processor;

a memory for storing instructions for execution by the processor, the instructions comprising:

a system state information repository for storing a plurality of session entries associated identifying sessions associated with NAT devices;

a session detection module for:

receiving one or more data packets originating from the NAT device, the one or more data packets containing a request to a destination server coupled to the computer network, wherein the data packets are transmission control protocol/Internet Protocol (TCP/IP) packets;

determining a client source address associated with the one or more data packets, the client source address associated with the NAT device;

determining one or more session entries associated with the client source address, wherein the session entries are stored in system state information;

determining a session signature based one or more characteristics defined by data packet header information and/or request header information in the one or more data packets, the session signature uniquely identifying one of the multiple computer user sessions coupled to the NAT device, wherein determining the session signature further comprises:

performing link-chain detection by comparing HTTP referrer field against browsing history associated with HTTP header in session and assigning a score to the detected links;

performing refresh detection if the HTTP referrer field is absent, a requested URL is compared against the browsing history to detect a page refresh and assigning a score to detected refreshes;

determining an activity score wherein the activity score is determined based upon a frequency with which events are associated with a given session;

determining an IPID trendline score based upon an IPID parameter;

assigning a user agent score based upon a determined web-browser identified in the request; and calculating a weighted score comprising the link chain detection, the refresh detection, the activity score, the IPID score and the user agent score;

wherein the weighted score is compared to one or more weighted scores each associated with a session entry in a session table to determine the session with the best matching score; and storing a new session entry in the system state information repository if the session signature is not associated with the one of the one or more sessions entries in the system state information; and a session declaration module for providing session identifying information, including an HTTP header summary and an associated session identifier, to one or more external systems for their use.

17. The apparatus of claim 16, wherein the memory for storing instructions for execution by the processor, further comprises a traffic data extraction module comprising:

a traffic interface for receiving the data packets in a TCP/IP traffic stream from a service provider network;

a TCP/IP header info extraction module for extracting information from the header of the TCP/IP packets;

an HTTP reassembly module for generating HTTP information that is contained across multiple TCP/IP packets, including both payloads and headers, to be reassembled into the HTTP header; and an HTTP header extraction module provides for extracting information from the reassembled HTTP header.

* * * * *